Feb. 27, 1962   J. W. BLACK   3,022,535

MECHANICAL DEVICE

Filed June 1, 1959

INVENTOR.
JOHN W. BLACK

BY
Woodhams Blanchard & Flynn
ATTORNEYS

United States Patent Office 3,022,535
Patented Feb. 27, 1962

3,022,535
MECHANICAL DEVICE
John W. Black, Kalamazoo Township, Kalamazoo County, Mich., assignor to Pemco Wheel Company, Kalamazoo, Mich., a corporation of Michigan
Filed June 1, 1959, Ser. No. 817,382
3 Claims. (Cl. 16—37)

This invention relates in general to a caster construction and, more particularly, to a caster stem including a cylindrical shank and structure associated therewith whereby said stem can be rigidly held within a stem cavity having a substantially larger cross-sectional area than said stem shank.

Casters, which are used for supporting articles having hollow legs, are commonly provided with elongated stems which are inserted into the lower ends of the legs. However, it often happens that it is desirable for the diameter of the opening in the lower end of the leg to be materially larger than the diameter required for the stem on the caster. Moreover, the opening in the leg may be of non-circular cross section whereas the stem, for economy reasons, is preferably cylindrical. Thus, for one or more reasons, it often develops that the stem is not snugly embraced by the walls of the cavity, which raises serious problems in attempting to anchor the stem in the leg.

Furthermore, it is often desirable to have clearance between the stem and the wall of the cavity, in which it is received, in order to provide proper drainage through the leg. For example, if a plating or cleaning operation is performed upon the leg after the caster is installed, the clearance between the stem and the leg is very helpful in draining the liquids.

In order to provide a rigid connection between the stem and the wall of an oversized cavity, it has been common practice to fill the excess space within the cavity by means of suitable shims, a sleeve or some form of cage-like structure. However, it has usually been necessary to provide additional securing means, such as pins, to hold the stem within the cavity, even though shims are provided. Such pins often weaken the leg structure or create points at which rusting occurs more readily, and the pins are usually unsightly and increase the cost of the assembly.

In addition to the above problems, it has also been found difficult to provide an inexpensive, completely satisfactory connection between a cylindrical stem and the walls of a cavity which has a non-circular, such as square, cross section. Even where a pin is used, the stem will often tend to work and thereby enlarge the size of the stem opening until failure eventually occurs. Thus, the use of pins is a temporary expedient at best and has not been found successful in overcoming the problem.

Accordingly, a primary object of this invention has been the provision of a stem construction having a cylindrical shank and integral structure thereon whereby said shank can be snugly and rigidly held within a cavity, such as that defined by a tubular member, having a cross-sectional area larger than the cross-sectionl area of the shank and, in some instances, being non-circular in shape.

A further object of this invention has been the provision of a stem construction, as aforesaid, which requires no additional parts, which can be produced by a stamping or forging operation, which eliminates the additional cost of irregular and/or oversized stem sizes and contours, which permits the use of a stem which has adequate strength to perform its intended duty but which may be substantially smaller in diameter than necessary under existing practices to be snugly received into the stem cavity, such as the opening at the lower end of a hollow leg member, on the article with which the caster is used.

A further object of this invention is the provision of a stem construction, as aforesaid, which is easy to produce, which can be accurately controlled, and which can be easily assembled not only with the caster frame, but also with the article with which it is intended to be used.

Other objects and purposes of this invention will become apparent to persons familiar with this type of equipment upon reading the following specification and examining the accompanying drawings in which.

Figure 1:
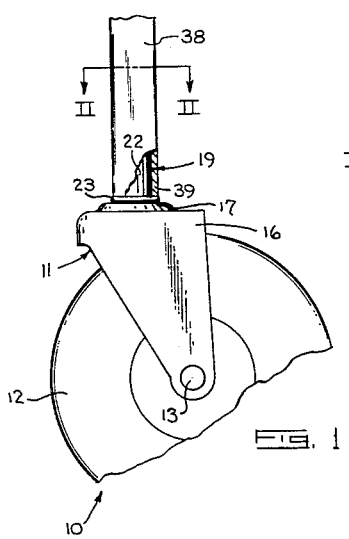
FIGURE 1 is a broken side-elevational view of a caster construction embodying the invention and disclosed with a portion of an article which it supports.
Figure 3:
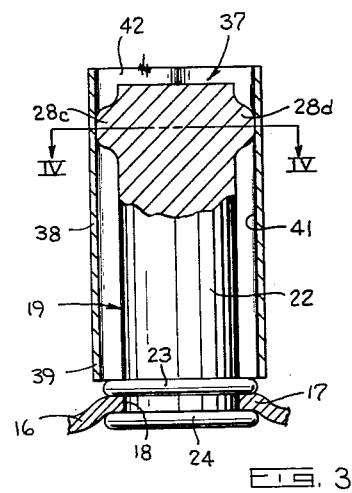
FIGURE 3 is a sectional view taken along the line III—III in FIGURE 2.
Figure 6:
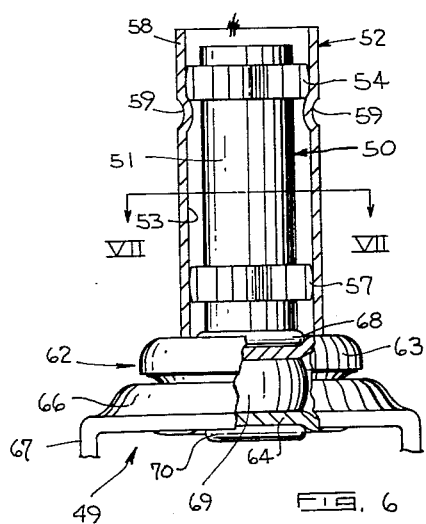
FIGURE 6 is a broken, side-elevational view of an alternate stem construction embodying the invention.

For the purpose of convenience in description, the terms "upper," "lower" and derivatives thereof will have reference to the caster stem structure disclosing the invention in its normal position of operation and as appearing in FIGURES 1, 3 and 6. The terms "inner," "outer" and derivatives thereof will have reference to the geometric center of said stem construction and parts associated therewith.

General description

The objects and purposes of the invention, including those set forth above, have been met by providing a caster construction (FIGURES 1 and 3), which is comprised of a wheel-supporting frame having a mounting plate which is secured to the lower end of the caster stem. In this particular embodiment, such securement is effected by inserting the stem through an opening in the mounting plate and by subjecting the lower end of the stem to a forging operation to form outwardly extending flanges which snugly embrace the upper and lower surfaces of the mounting plate adjacent to the opening therein. A portion of said stem spaced from the flanges thereon is then subjected to another forging operation whereby portions of the metal in the stem are caused to flow radially outwardly away from the peripheral surface of the stem to provide a plurality of projections, which in a preferred embodiment, are coextensive from the axis of the stem and define a plane substantially perpendicular to said axis.

Figure 2:
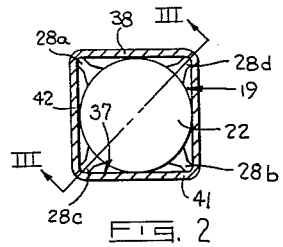
FIGURE 2 is a sectional view taken along the line II—II in FIGURE 1.

Thus, all embodiments of the invention employ a stem having integral, radially extending projections adjacent one end thereof together with other integral means which engage the internal wall of the cavity at least at points along said stem spaced axially from said projections to prevent radial movement of the stem within the cavity in which it is mounted. Where the cavity has an out-of-round, e.g. polygonal, cross section as shown in FIGURE 2, in order to prevent radial movement or wobble of the stem within the cavity, the projections extend into the corners of the cavity and the remainder of the stem is of circular cross section of a diameter which is the same as the diameter of the inscribed circle of the cavity. Where the cavity is round, as shown in FIGURE 6, a second group of radially extending projections are provided adjacent the other end of the stem and these also engage the internal wall of the cavity to prevent radial movement of the stem within the cavity.

The projections on the stem, where same is mounted with an out-of-round cavity, serve to prevent relative rotation between the stem and the cavity. Welding the projections to the wall defining the cavity will also serve to prevent such relative rotation and this may be done where the cavity is either round or out-of-round. Also, a pin may extend through the stem and be secured to the wall of the cavity for the same purpose for either a round or out-of-round cavity.

Welding the projections or the use of the pin, as discussed above, may be employed to prevent axial movement of the stem in the cavity. In addition, the wall defining the cavity may be indented to engage the projections and prevent axial movement thereof. This may be done where the cavity is round or out-of-round.

The structure of the invention may be used with swivel or nonswivel casters.

Detailed construction

The caster 10 (FIGURE 1), which has been selected to illustrate a particular embodiment of the invention, is comprised of a caster frame or yoke 11 upon and within which a wheel 12 is rotatably supported by means of an axle 13, in any convenient manner. The frame 11 includes a top plate 16 having a raised central portion 17 (FIGURE 3) with a stem opening 18 therethrough.

The stem 19 (FIGURE 3) has a solid cylindrical shank 22 the lower end of which is snugly received into the stem opening 18. The lower end of the shank 22 is subjected to a suitable forging operation whereby the annular flanges 23 and 24 are formed on said shank 22 adjacent to the upper and lower sides, respectively, of the central portion 17, whereby said stem 19 is rigidly held with respect to the top plate 16, hence the caster frame 11. Further, a welding operation may be performed at the connection between the shank 22 and central portion 17, if desired.

Figure 4:
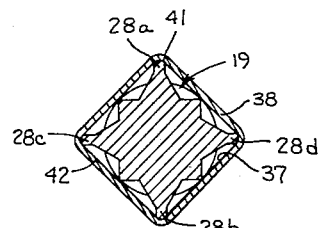
FIGURE 4 is a sectional view taken along the line IV—IV in FIGURE 3.
Figure 5:
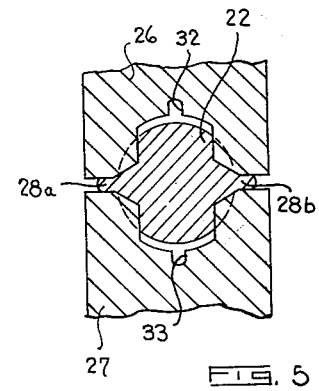
FIGURE 5 is a cross-sectional view of a stem and a pair of dies whereby the stem is shaped in accordance with the teachings of the invention.

A plurality of radial projections or integral elements 28 (FIGURE 4) are forged from the metal in the shank 22 at uniform intervals therearound by the dies 26 and 27 (FIGURE 5). The forging operation, which is performed in two stages, is commenced by placing the upper end of the shank 22 between the dies 26 and 27, whereby the projections 28a and 28b are formed on diametrically opposite sides of the shank. The shank 22 is then rotated approximately 90 degrees so that the projections 28a and 28b will be aligned with and received into the projection recesses 32 and 33 in the dies 26 and 27, respectively. The second stage of the forging operation by the dies 26 and 27 is then performed, whereby the third and fourth projections 28c and 28d are formed in the shank 22. In this particular embodiment, the four projections 28 are preferably indentical and coextensive from the axis of the shank 22 and define a plane substantially perpendicular to said axis.

The dies 26 and 27 are arranged and operated so that the projections 28 produced thereby define a polygonal, non-circular shape similar to, and of size substantially identical with, the internal opening defined by the walls of the cavity 37 in the tubular member 38, which may be the leg of a table, a chair or any similar device requiring castered support. In this embodiment, the polygonal shape is a square for illustrative purposes and because it effectively discloses a particular, useful application of the invention.

The upper end of the formed stem 19 is inserted into the cavity 37 with said projections 28 slidably and snugly disposed in the corners 41 between the adjacent side walls 42 defining the cavity 37. Said stem is urged upwardly preferably until the lower end 39 of the leg 38 bears against the upper annular flange 23. Under some circumstances, the frictional engagement between the projections 28 and the side walls of the cavity 37 is sufficient to hold the stem 19 firmly and operably within the leg 38, particularly where the peripheral surface of the shank 22 is snugly engaged by the inner surface of the side walls 42. However, where additional securement is desired, such can be accomplished by an electric welding operation between the leg 38 and the projections 28 at their points of contact.

Because the projections 28 are work hardened by the forging operation and are located snugly within the corners 41, they effectively prevent collapse or rounding of the corners 41, such collapse or rounding being necessary to permit the occurrence of movement between a stem 19 and a leg 38. Thus, the projections 28 not only positively oppose rotary and lateral movement of the stem with respect to the leg 38, but also prevent the cumulative type of distortion in the leg which can occur as a result of such movement.

Alternate construction

Figure 7:
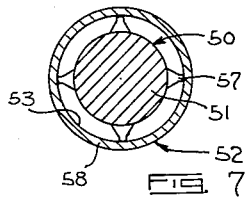
FIGURE 7 is a sectional view taken along the line VII—VII in FIGURE 6.

As shown in FIGURES 6 and 7, it may be desirable under some circumstances to provide a swivel caster 49 with a stem 50 having a cylindrical shank 51 which is substantially smaller in diameter than the inside diameter of a cylindrical cavity 53 in a leg 52 or other member into which the stem 50 is received. The projections 54 are formed by dies 26 and 27 (FIGURE 5), which cause the shank metal to flow radially outwardly in the same manner set forth above with respect to the projections 28.

Because of the fact that the shank 51 is of less diameter than the cavity 53, it is necessary to provide another group of projections 57 near the lower end of the shank 51 which projections cooperate with the projections 54 to prevent any radial movement of the shank 51 with respect to the leg 52. The stem 50 may be secured in place within the leg 52 by an electric welding operation between the leg and the projections 54, for example. Alternatively, the wall 58 of the leg 52 may be dented slightly, as shown at 59, just below one set of the projections, such as projections 54, after the stem 50 is assembled within the leg 52.

The alternate caster construction 49 (FIGURE 6) also illustrates the use of this invention with casters of the swivel bearing type. There is here shown a swivel bearing assembly 62 having a pair of retainer rings 63 and 64 disposed upon the upper and lower surfaces, respectively, of the top plate 66 of the caster frame 67. By means of a forging operation, the retainer rings 63 and 64 are rigidly secured upon the shank 51 between three spaced annular and radially outwardly extending flanges 68, 69 and 70, as described more fully in my copending application Serial No. 678,287, filed August 15, 1957, which is directed to this particular feature. Accordingly, it will be seen that the stem construction of the invention may be utilized as conveniently with a swivel caster having one or more swivel bearings as it can with a conventional, non-swivel caster of the type shown in FIGURE 1.

Relative radial movement of the stem 50 with respect to the leg 52 is prevented by means of the interengagement between the projections 54 and 57, and the wall 58 of the cavity 53 in much the same manner as set forth above in detail with respect to the stem construction 19.

It will be recognized that specific reference herein to stem constructions for use with legs having square and circular cross sections is not intended to eliminate the applicability of the invention to circumstances where the legs have other shapes. Thus, although particular, preferred embodiments of the invention have been disclosed in detail above for illustrative purposes, it will be understood that variations or modifications of such disclosure, which lie within the scope of the appended claims, are fully contemplated.

What is claimed is:

1. A caster construction for supporting an article, comprising: wall means on said article defining an elongated, straight passageway open at the lower end thereof and having a square cross section; a caster yoke having a mounting plate and a pair of spaced, wheel supporting elements extending downwardly from said mounting plate; a caster wheel rotatably supported upon and between said wheel supporting elements; a single, elongated stem supported upon and extending upwardly from the central portion of said mounting plate and being deformed at a point spaced from the lower end thereof to form four projections uniformly spaced circumferentially around, and extending radially from, said stem beyond the adjacent surface thereof, said stem being circular in cross section substantially throughout its length and having a diameter substantially equal to the diameter of the inscribed circle defined by said wall means, said stem being slidably received within said passageway with said projections extending into the corners defined by said wall means and with opposite portions on the peripheral surface of said single stem engaging said wall means, whereby rotation of said stem with respect to said wall means is positively prevented.

2. A caster mounting structure according to claim 1 wherein said projections are welded to said wall means and said stem is rigidly secured to said mounting plate, whereby said stem is rigidly secured within said opening.

3. A caster construction for supporting an article, comprising: wall means on said article defining an elongated, straight passageway open at the lower end thereof and having a square cross section; a caster yoke having a mounting plate and a pair of spaced, wheel supporting elements extending downwardly from said mounting plate; a caster wheel rotatably supported upon and between said wheel supporting elements; a single elongated stem, and swivel bearing means supporting said stem upon the central portion of said mounting plate for rotation around the lengthwise axis of said stem, said stem extending upwardly from said mounting plate and being deformed at a point spaced from the lower end thereof to form four projections uniformly spaced circumferentially around, and extending radially from, said stem beyond the adjacent surface thereof, the remainder of said stem being circular in cross section substantially throughout its length and having a diameter substantially equal to the diameter of the inscribed circle defined by said wall means, said stem being slidably received within said passageway with said projections extending into the corners defined by said wall means and with opposite portions on the periphery of said remainder of said stem engaging said wall means, whereby rotation of said stem with respect to said wall means is positively prevented.

References Cited in the file of this patent
UNITED STATES PATENTS

| | | |
|---|---|---|
| 699,792 | Davis | May 13, 1902 |
| 806,435 | Schenck | Dec. 5, 1905 |
| 1,094,744 | Palmer | Apr. 28, 1914 |
| 1,546,186 | Aubitz | July 14, 1925 |
| 1,630,514 | Bayer | May 31, 1927 |
| 2,081,594 | McIntosh | May 25, 1937 |
| 2,748,419 | Kramcsak | June 5, 1956 |